(12) United States Patent
Ma et al.

(10) Patent No.: US 10,793,779 B2
(45) Date of Patent: Oct. 6, 2020

(54) METHOD FOR SEPARATING SOLUBLE ORGANIC MATTER IN PETROLEUM COKE

(71) Applicant: Shandong Chambroad Petrochemicals Co., Ltd., Shandong (CN)

(72) Inventors: Weiwei Ma, Shandong (CN); Taoyuan Hao, Shandong (CN); Bo Luan, Shandong (CN); Yaowei Wang, Shandong (CN)

(73) Assignee: Shandong Chambroad Petrochemicals Co., Ltd., Shandong (CN)

( * ) Notice: Subject to any disclaimer, the term of this patent is extended or adjusted under 35 U.S.C. 154(b) by 43 days.

(21) Appl. No.: 15/753,562

(22) PCT Filed: Jul. 21, 2017

(86) PCT No.: PCT/CN2017/093774
§ 371 (c)(1),
(2) Date: Feb. 20, 2018

(87) PCT Pub. No.: WO2018/113289
PCT Pub. Date: Jun. 28, 2018

(65) Prior Publication Data
US 2019/0078025 A1    Mar. 14, 2019

(30) Foreign Application Priority Data

Dec. 20, 2016 (CN) .......................... 2016 1 1187667

(51) Int. Cl.
*C10G 1/04* (2006.01)
*B01D 11/02* (2006.01)

(52) U.S. Cl.
CPC ............ *C10G 1/04* (2013.01); *B01D 11/0265* (2013.01); *B01D 11/0284* (2013.01); *B01D 2257/702* (2013.01); *B01D 2259/816* (2013.01)

(58) Field of Classification Search
CPC .......... C10G 1/04; C10G 21/00; C10G 21/02; C10G 21/06; C10G 53/06; B01D 11/02;
(Continued)

(56) References Cited

U.S. PATENT DOCUMENTS

| | | | | |
|---|---|---|---|---|
| 4,369,171 | A | * | 1/1983 | Grindstaff ............. C04B 35/532 208/22 |
| 2010/0108570 | A1 | * | 5/2010 | Nath ........................ C10G 9/14 208/131 |
| 2017/0174998 | A1 | * | 6/2017 | Harrington ........ B01D 11/0223 |

FOREIGN PATENT DOCUMENTS

| CN | 102229810 A | 11/2011 |
|---|---|---|
| CN | 102260511 A | 11/2011 |

(Continued)

OTHER PUBLICATIONS

Search Report issued in PCT/CN2017/093774 dated Oct. 14, 2017, 5 pages.
(Continued)

*Primary Examiner* — Prem C Singh
*Assistant Examiner* — Brandi M Doyle
(74) *Attorney, Agent, or Firm* — RatnerPrestia

(57) ABSTRACT

The present disclosure provides a method for separating soluble organic matter in petroleum coke, including: drying the petroleum coke to obtain pretreated petroleum coke; extracting the pretreated petroleum coke sequentially with petroleum ether, carbon disulfide, ethanol, acetone-carbon disulfide mixture and tetrahydrofuran to obtain an extract and the treated petroleum coke, wherein the extract includes soluble organic matter. The method provided by the present disclosure employs extractants with different polarities, i.e., petroleum ether, carbon disulfide, ethanol, acetone-carbon disulfide mixture and tetrahydrofuran, to extract petroleum coke sequentially, so as to detect the composition of the soluble organic matter in petroleum coke at the molecular
(Continued)

level, realizing the separation of soluble organic matter in petroleum coke at the macro molecular level, as well as the determination of molecular structure of soluble organic matter in petroleum coke by modern detection processes.

8 Claims, 1 Drawing Sheet

(58) Field of Classification Search
CPC .......... B01D 11/0211; B01D 11/0265; B01D 11/0288; B01D 11/0292; B01D 11/0223; C10B 57/005
See application file for complete search history.

(56) References Cited

FOREIGN PATENT DOCUMENTS

| | | | |
|---|---|---|---|
| CN | 102649723 | A | 8/2012 |
| CN | 103076417 | A | 5/2013 |
| CN | 103173280 | A | 6/2013 |
| CN | 105352985 | A | 2/2016 |
| CN | 105734723 | A | 7/2016 |
| CN | 105969418 | A | 9/2016 |
| CN | 106582058 | A | 4/2017 |
| JP | 09510214 | A | 10/1997 |
| WO | 9524370 | A1 | 9/1995 |

OTHER PUBLICATIONS

Lu, Chao, "Study on the Preparation of Needle Coke by Pretreated FCC Slurry" with English Abstract, East China University of Technology, Master Thesis, Jun. 15, 2013, 67 pages.

Zhang, Lu, "Research on Occurrence of the Organic Sulfur in Coke Coal via Accelerated Solvent Extraction" with English Abstract, China University of Mining, Master Thesis, Feb. 15, 2015, 7 pages.

Chinese Office Action with English Summary for Chinese Application No. 201611187667.2, dated Apr. 19, 2018, 7 pages.

\* cited by examiner

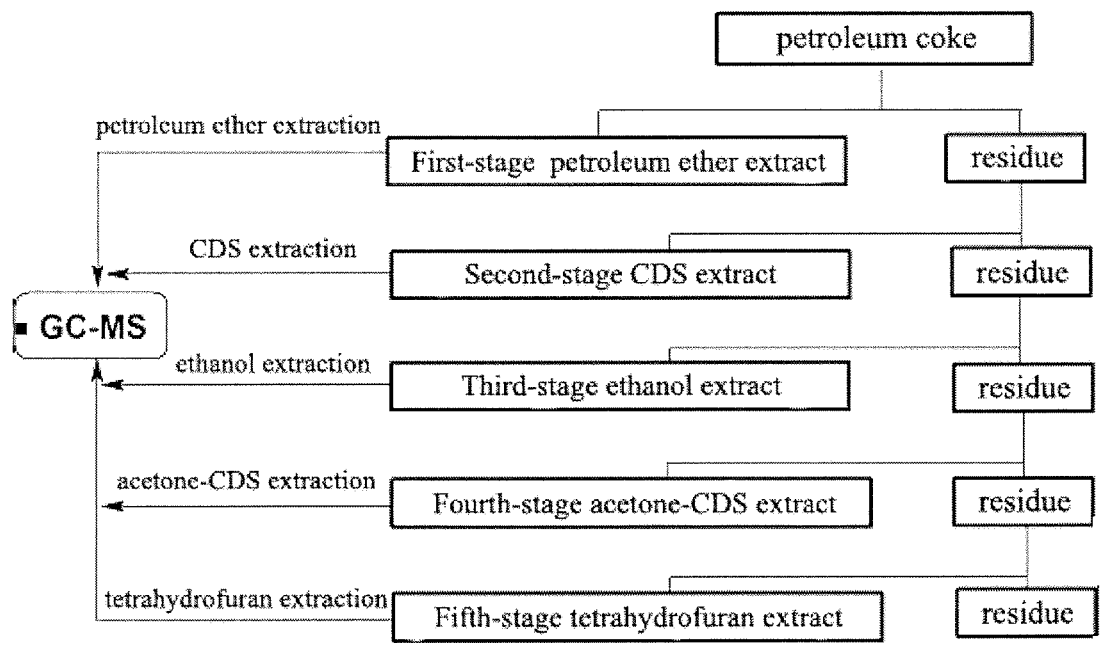

METHOD FOR SEPARATING SOLUBLE ORGANIC MATTER IN PETROLEUM COKE

CROSS REFERENCE TO RELATED APPLICATIONS

This application is the U.S. National Phase Application of PCT/CN2017/093774, titled "METHOD FOR SEPARATING SOLUBLE ORGANIC MATTER IN PETROLEUM COKE," filed on Jul. 21, 2017, which claims the priority of Chinese Patent Application No. 201611187667.2, filed on Dec. 20, 2016, and titled with "METHOD FOR SEPARATING SOLUBLE ORGANIC MATTER IN PETROLEUM COKE," and the disclosures of which are hereby incorporated by reference.

FIELD

The present invention relates to the field of petroleum coke, specifically to a method for separating the soluble organic matter in petroleum coke.

BACKGROUND

Petroleum coke is the product that obtained by thermal cracking the heavy oil, which is separated from the light oil by distillation of the crude oil. From the appearance, coke is in the form of irregular-shaped black lumps (or particles) with different sizes and metallic gloss. The coke particle has porous structure, with carbon as the main element, which takes up over 80 wt %, and hydrogen, oxygen, nitrogen, sulfur and metal as the rest.

At present, petroleum coke is generally used solely in electrolytic aluminum industry and as a fuel. One of the key issues restricting the high value-added and non-fuel utilization of petroleum coke is that people know little about organic composition structure of petroleum coke at the molecular level. Conventional researches on organic composition structure of petroleum coke are limited to elemental analysis and industrial analysis, thus it is hard to find a way to analyze the composition of organic matter in petroleum coke at the molecular level.

SUMMARY

In view of above, the present disclosure aims to provide a method for separating soluble organic matter in petroleum coke, which can analyze the composition of soluble organic matter in petroleum coke at the molecular level.

The present disclosure provides a method for separating soluble organic matter in petroleum coke, comprising:

drying the petroleum coke to obtain pretreated petroleum coke;

extracting the pretreated petroleum coke sequentially with petroleum ether, carbon disulfide, ethanol, acetone-carbon disulfide mixture and tetrahydrofuran to obtain an extract and the treated petroleum coke, wherein the extract comprises soluble organic matter.

Preferably, the sequential extraction of the pretreated petroleum coke with petroleum ether, carbon disulfide, ethanol, acetone-carbon disulfide mixture and tetrahydrofuran specifically comprises:

mixing the pretreated petroleum coke and petroleum ether, carrying out a first-stage ultrasonic extraction for multiple times, and obtaining a first-stage extract and a first-stage residue;

mixing the first-stage residue and carbon disulfide, carrying out a second-stage ultrasonic extraction for multiple times, and obtaining a second-stage extract and a second-stage residue;

mixing the second-stage residue and ethanol, carrying out a third-stage ultrasonic extraction for multiple times, and obtaining a third-stage extract and a third-stage residue;

mixing the third-stage residue and acetone-carbon disulfide mixture, carrying out a fourth-stage ultrasonic extraction for multiple times, and obtaining a fourth-stage extract and a fourth-stage residue;

mixing the fourth-stage residue and tetrahydrofuran, carrying out a fifth-stage ultrasonic extraction for multiple times, and obtaining a fifth-stage extract and a fifth-stage residue;

the temperature for each ultrasonic extraction is 30° C. to 40° C., and duration for each ultrasonic extraction is 1.5 h to 3 h.

Preferably, the volume ratio of the acetone to the carbon disulfide in the acetone-carbon disulfide mixture is 2:1.

Preferably, the particle size of the petroleum coke is less than 200 mesh.

Preferably, the volume ratio of the pretreated petroleum coke to petroleum ether is 1:5 to 10;

the volume ratio of the first-stage residue to carbon disulfide is 1:5 to 10;

the volume ratio of the second-stage residue to ethanol is 1:5 to 10;

the volume ratio of the third-stage residue to acetone-carbon disulfide mixture is 1:5 to 10;

the volume ratio of the fourth-stage residue to tetrahydrofuran is 1:5 to 10.

Preferably, the temperature for drying is 98° C. to 105° C.; the duration for drying is 40 to 60 h.

Preferably, the multiple ultrasonic extraction is conducted for more than 30 times.

Preferably, temperature for each ultrasonic extraction is 35° C., and the duration for each ultrasonic extraction is 2 h.

Preferably, after obtaining the first-stage extract, further comprising:

concentrating the first-stage extract, and obtaining first-stage concentrate;

analyzing the first-stage concentrate by gas chromatography-mass spectrometry.

The present disclosure provides a method for separating soluble organic matter in petroleum coke, comprising: drying petroleum coke to obtain the pretreated petroleum coke; extracting the pretreated petroleum coke sequentially with petroleum ether, carbon disulfide, ethanol, acetone-carbon disulfide mixture and tetrahydrofuran to obtain an extract and the treated petroleum coke, wherein the extract comprises soluble organic matter. The method provided by the present disclosure employs extractants with different polarities, i.e., petroleum ether, carbon disulfide, ethanol, acetone-carbon disulfide mixture and tetrahydrofuran, to extract petroleum coke sequentially, so as to detect the composition of the soluble organic matter in petroleum coke at the molecular level, realizing the separation of soluble organic matter in petroleum coke at the macro molecular level, as well as the determination of molecular structure of soluble organic matter in petroleum coke by modern detection means.

BRIEF DESCRIPTION OF DRAWINGS

FIG. 1 is the process flow chart of separating soluble organic matter in petroleum coke provided by the present disclosure.

DETAILED DESCRIPTION

The technical solutions in the examples of the present disclosure will be described clearly and completely herein. Apparently, the described examples are only a part of the examples of the present disclosure, rather than all examples. Based on the examples in the present disclosure, all of other examples, made by one of ordinary skill in the art without any creative efforts, fall into the protection scope of the present disclosure.

The present disclosure provides a method for separating soluble organic matter in petroleum coke, comprising:

drying petroleum coke to obtain the pretreated petroleum coke;

extracting the pretreated petroleum coke sequentially with petroleum ether, carbon disulfide, ethanol, acetone-carbon disulfide mixture and tetrahydrofuran to obtain an extract and the treated petroleum coke, wherein the extract comprises soluble organic matter.

The method provided by the present disclosure employs extractants with different polarities. i.e., petroleum ether, carbon disulfide, ethanol, acetone-carbon disulfide mixture and tetrahydrofuran to extract petroleum coke sequentially, so as to detect the composition of the soluble organic matter in petroleum coke at the molecular level, realizing the separation of soluble organic matter in petroleum coke at the macro molecular level, as well as the determination of molecular structure of soluble organic matter in petroleum coke by modern detection means.

In the present disclosure, petroleum coke is dried to obtain pretreated petroleum coke. In the present disclosure, petroleum coke is preferably subjected to ball milling and sieving to obtain the petroleum coke with a particle size of no more than 200 mesh. In the present disclosure, ball milling is preferably carried out by using ball mill that is well-known to those skilled in the art. In the present disclosure, drying is carried out by using vacuum drying oven that is well-known to those skilled in the art. In the present disclosure, the temperature for drying is preferably 95 to 105° C.; more preferably 100° C.; the duration for drying is preferably 40 to 60 h, more preferably 48 h. In the present disclosure, the sieved petroleum coke should be fully dried, so as to avoid affecting the subsequent process.

After obtaining the pretreated petroleum coke, in the present disclosure, the pretreated petroleum coke is extracted sequentially with petroleum ether, carbon disulfide, ethanol, acetone-carbon disulfide mixture and tetrahydrofuran, to obtain treated petroleum coke.

In the present disclosure, the sequential extraction of the pretreated petroleum coke with petroleum ether, carbon disulfide, ethanol, acetone-carbon disulfide mixture and tetrahydrofuran specifically comprises:

mixing the pretreated petroleum coke and petroleum ether, carrying out a first-stage ultrasonic extraction for multiple times, and obtaining a first-stage extract and a first-stage residue;

mixing the first-stage residue and carbon disulfide, carrying out a second-stage ultrasonic extraction for multiple times, and obtaining a second-stage extract and a second-stage residue;

mixing the second-stage residue and ethanol, carrying out a third-stage ultrasonic extraction for multiple times, and obtaining a third-stage extract and a third-stage residue;

mixing the third-stage residue and acetone-carbon disulfide mixture, carrying out a fourth-stage ultrasonic extraction for multiple times, and obtaining a fourth-stage extract and a fourth-stage residue;

mixing the fourth-stage residue and tetrahydrofuran, carrying out a fifth-stage ultrasonic extraction for multiple times, and obtaining a fifth-stage extract and a fifth-stage residue;

wherein the temperature for each ultrasonic extraction is 30° C. to 40° C., and duration for each ultrasonic extraction is 1.5 h to 3 h.

In the present disclosure, the pretreated petroleum coke are mixed with petroleum ether, and subjected to first-stage ultrasonic extraction for multiple times to obtain a first-stage extract and a first-stage residue. In the present disclosure, the volume ratio of the pretreated petroleum coke to petroleum ether is preferably 1:5 to 10. In the present disclosure, the pretreated petroleum coke and petroleum ether are mixed in a beaker. In the present disclosure, the first-stage ultrasonic extraction is carried out by using an ultrasonic cleaner that is well-known to those skilled in the art. In the present disclosure, the first-stage ultrasonic extraction is preferably conducted for more than 30 times; the temperature for each first-stage ultrasonic extraction is preferably 30° C. to 40° C., more preferably 35° C.; the duration for each first-stage ultrasonic extraction is preferably from 1.5 to 3 h, more preferably 2 h. After obtaining the first-stage extract, the method further comprises:

concentrating the first-stage extract, and obtaining first-stage concentrate;

analyzing the first-stage concentrate by gas chromatography-mass spectrometry.

In the present disclosure, the first-stage extract is preferably transferred to a buffer tank by vacuum filtration, and the extract in the buffer tank is transferred out using a flask thereafter. Excess solvent is removed by using a rotary evaporator under normal pressure, so as to concentrate the first-stage extract to 3 to 5 mL. The first-stage concentrate is analyzed by chromatography-mass spectrometry before drying.

After completing the first-stage ultrasonic extraction for the first time, in the present disclosure, the pretreated petroleum coke obtained from the first-stage ultrasonic extraction is preferably mixed with petroleum ether again, for carrying out the first-stage extraction for the second time. The first-stage ultrasonic extraction is conducted repeatedly until no compound in the last concentrate could be detected by gas chromatography (GC), to ensure that the first-stage ultrasonic extraction is complete.

In the present disclosure, the concentrate from the extraction of the same stage is not mixed, and the concentrate is analyzed by gas chromatography-mass spectrometry (GC-MS) before drying.

In the present disclosure, the first-stage residue and carbon disulfide are mixed, and subjected to second-stage ultrasonic extraction for several times, to obtain a second-stage extract and a second-stage residue. In the present disclosure, the volume ratio of the first-stage residue to carbon disulfide is 1:5 to 10. In the present disclosure, the first-stage residue is preferably mixed with carbon disulfide in a beaker. In the present disclosure, the second-stage ultrasonic extraction is preferably carried out by using an ultrasonic cleaner that is well-known to those skilled in the art. In the present disclosure, the second-stage ultrasonic extraction is preferably repeated for more than 30 times; the temperature for each second-stage ultrasonic extraction is preferably 30° C. to 40° C., more preferably 35° C.; the duration for each second-stage ultrasonic extraction is preferably 1.5 to 3 h, more preferably 2 h. After obtaining the second-stage extract, the method further comprises:

concentrating the second-stage extract to obtain second-stage concentrate;

analyzing the second-stage concentrate by gas chromatography-mass spectrometry.

In the present disclosure, the second-stage extract is preferably transferred to a buffer tank by vacuum filtration, and the extract in the buffer tank is transferred out using a flask thereafter. Excess solvent is removed by using a rotary evaporator under normal pressure, so as to concentrate the second-stage extract to 3 to 5 mL. The second-stage concentrate is subjected to chromatography-mass spectrometry analysis before drying.

After completing the second-stage ultrasonic extraction for the first time, in the present disclosure, the pretreated petroleum coke obtained from the second-stage ultrasonic extraction is preferably mixed with carbon disulfide again, for carrying out the second-stage extraction for the second time. The second-stage ultrasonic extraction is conducted repeatedly until no compound in the last concentrate could be detected by gas chromatography (GC), to ensure that the second-stage ultrasonic extraction is complete.

In the present disclosure, the second-stage residue and ethanol are mixed, and subjected to third-stage ultrasonic extraction for multiple times, to obtain a third-stage extract and a third-stage residue. In the present disclosure, the volume ratio of the second-stage residue to ethanol is 1:5 to 10. In the present disclosure, the second-stage residue is preferably mixed with ethanol in a beaker. In the present disclosure, the third-stage ultrasonic extraction is preferably carried out by using an ultrasonic cleaner that is well-known to those skilled in the art. In the present disclosure, the third-stage ultrasonic extraction is preferably conducted repeatedly for more than 30 times; the temperature for each third-stage ultrasonic extraction is preferably 30° C. to 40° C., more preferably 35° C.; the duration for each third-stage ultrasonic extraction is preferably 1.5 to 3 h, more preferably 2 h. After obtaining the third-stage extract, the method further comprises:

concentrating the third-stage extract to obtain third-stage concentrate;

analyzing the third-stage concentrate by gas chromatography-mass spectrometry.

In the present disclosure, the third-stage extract is preferably transferred to a buffer tank by vacuum filtration, and the extract in the buffer tank is transferred out using a flask thereafter. Excess solvent is removed by using a rotary evaporator under normal pressure, so as to concentrate the third-stage extract to 3 to 5 mL. The third-stage concentrate is subjected to chromatography-mass spectrometry analysis before drying.

After completing the third-stage ultrasonic extraction for the first time, in the present disclosure, the second-stage residue is preferably mixed with ethanol again, for carrying out the third-stage extraction for the second time. The third-stage ultrasonic extraction is repeated until no compound in the last concentrate could be detected by gas chromatography (GC), to ensure that the third-stage ultrasonic extraction is complete.

In the present disclosure, the third-stage residue and acetone-carbon disulfide mixture are mixed, and subjected to fourth-stage ultrasonic extraction for several times, to obtain a fourth-stage extract and a fourth-stage residue. In the present disclosure, the volume ratio of acetone to carbon disulfide in the acetone-carbon disulfide mixture is 2:1. In the present disclosure, the volume ratio of the third-stage residue to carbon disulfide is 1:5 to 10. In the present disclosure, the third-stage residue is preferably mixed with acetone-carbon disulfide mixture in a beaker. In the present disclosure, the fourth-stage ultrasonic extraction is preferably carried out by using an ultrasonic cleaner that is well-known to those skilled in the art. In the present disclosure, the fourth-stage ultrasonic extraction is preferably repeated for more than 30 times; the temperature for each fourth-stage ultrasonic extraction is preferably 30° C. to 40° C., more preferably 35° C.; the duration for each fourth-stage ultrasonic extraction is preferably 1.5 to 3 h, more preferably 2 h. After obtaining the fourth-stage extract, the method further comprises:

concentrating the fourth-stage extract, to obtain fourth-stage concentrate;

analyzing the fourth-stage concentrate by gas chromatography-mass spectrometry.

In the present disclosure, the fourth-stage extract is preferably transferred to a buffer tank by vacuum filtration, and the extract in the buffer tank is transferred out using a flask thereafter. Excess solvent is removed by using a rotary evaporator under normal pressure, so as to concentrate the fourth-stage extract to 3 to 5 mL. The fourth-stage concentrate is analyzed by chromatography-mass spectrometry before drying.

After completing the fourth-stage ultrasonic extraction for the first time, in the present disclosure, the third-stage residue is preferably mixed with acetone-carbon disulfide mixture again, for carrying out the fourth-stage extraction for the second time. The fourth-stage ultrasonic extraction is conducted repeatedly until no compound in the last concentrate could be detected by gas chromatography (GC), to ensure that the fourth-stage ultrasonic extraction is complete.

In the present disclosure, the fourth-stage residue and tetrahydrofuran are mixed, and subjected to fifth-stage ultrasonic extraction for several times, to obtain a fifth-stage extract and treated petroleum coke. In the present disclosure, the volume ratio of the fourth-stage residue to tetrahydrofuran is 1:5 to 10. In the present disclosure, the fourth-stage residue is preferably mixed with tetrahydrofuran in a beaker. In the present disclosure, the fifth-stage ultrasonic extraction is preferably carried out by using an ultrasonic cleaner that is well-known to those skilled in the art. In the present disclosure, the fifth-stage ultrasonic extraction is preferably repeated for more than 30 times; the temperature for each fifth-stage ultrasonic extraction is preferably 30° C. to 40° C., more preferably 35° C.; the duration for each fifth-stage ultrasonic extraction is preferably 1.5 to 3 h, more preferably 2 h. After obtaining the fifth-stage extract, the method further comprises:

concentrating the fifth-stage extract to obtain fifth-stage concentrate;

analyzing the fifth-stage concentrate by gas chromatography-mass spectrometry.

In the present disclosure, the fifth-stage extract is preferably transferred to a buffer tank by vacuum filtration, and the extract in the buffer tank is transferred out using a flask thereafter. Excess solvent is removed by using a rotary evaporator under normal pressure, so as to concentrate the fifth-stage extract to 3 to 5 mL. The fifth-stage concentrate is analyzed by chromatography-mass spectrometry before drying.

After completing the fifth-stage ultrasonic extraction for the first time, in the present disclosure, the fourth-stage residue is preferably mixed with tetrahydrofuran again, for carrying out the fifth-stage extraction for the second time. The fifth-stage ultrasonic extraction is conducted repeatedly until no compound in the last concentrate could be detected by gas chromatography (GC), to ensure that the fifth-stage ultrasonic extraction is complete.

Specifically, reference is made to FIG. 1, which is a process flow chart of separating soluble organic matter in petroleum coke provided by the present disclosure.

In the present disclosure, petroleum coke is extracted with petroleum ether to obtain a first-stage petroleum ether extract and a first-stage residue, wherein the first-stage petroleum ether extract is the aforesaid first-stage extract; the first-stage residue is extracted with CDS, to obtain a second-stage CDS extract and a the-second stage residue, wherein the second-stage CDS extract is the aforesaid second-stage extract; the second-stage residue is extracted with ethanol, to obtain a third-stage ethanol extract and a the third-stage residue, wherein the third-stage ethanol extract is the aforesaid third-stage extract; the third-stage residue is extracted with acetone-CDS, to obtain a fourth-stage acetone-CDS extract and a fourth-stage residue, wherein the fourth stage acetone-CDS extract is the aforesaid fourth-stage extract; the fourth-stage residue is extracted with tetrahydrofuran, to obtain a fifth-stage tetrahydrofuran extract and a fifth-stage residue, the fifth-stage tetrahydrofuran extract is the aforesaid fifth-stage extract, wherein the fifth-stage residue is the treated petroleum coke.

In order to better understand the present disclosure, the method provided by the present disclosure will be illustrated clearly in conjunction with examples herein.

All the materials used in the examples are commercial products.

Example 1

(1) Sieving small-grain coke: Petroleum coke was grinded to small-grain coke using ball mill, and sieved with a 200 mesh sieve, so as to remove the coke having a diameter of more than 200 mesh (particle size >75 μm). The sieved small-grain coke was dried in a vacuum drying oven at 100° C. for 48 h to ensure the small-grain coke was fully dried, and avoid affecting the subsequent experiments.

(2) Solvent extraction: 100 g of small-grain coke was placed in a 1 L beaker, into which 900 mL of petroleum ether was first added as the solvent before the beaker was placed in an ultrasonic cleaner at 35° C. for conducting the first-stage ultrasonic extraction for 2 h. The first-stage extract was transferred into a buffer tank by vacuum filtration, and the extract in the buffer tank is transferred out using a flask thereafter. Excess solvent is removed by using a rotary evaporator under normal pressure, so as to concentrate the extract to 3 to 5 mL, obtaining the first-stage petroleum ether extract. Fresh petroleum ether was added into the 1 L beaker for conducting the first-stage ultrasonic extraction for the second time. The first stage ultrasonic extraction was conducted repeatedly to ensure the extraction of this stage was completed.

In the present disclosure, the first-stage petroleum ether extract was analyzed by GC-MS, and the results were shown in Table 1. Table 1 shows the results of GC-MS analysis of the first-stage petroleum ether extract.

TABLE 1

Results of GC-MS analysis of the first-stage petroleum ether extract

| Group Composition | | Compound |
|---|---|---|
| Alkane | | |
| | 1 | 2,3-dimethyl hexane |
| | 2 | cis-1,2-dimethyl cyclopentane |
| | 3 | Heptane |
| | 4 | methyl cyclohexane |
| | 5 | trans-1,4-dimethle cyclohexane |
| | 6 | octane |
| | 7 | 2,4-dimethyl heptane |
| | 8 | 4-methyloctane |
| | 9 | decane |
| | 10 | tetradecane |
| | 11 | hexadecane |
| | 12 | hexacosane |
| | 13 | hentriacontane |
| Aromatic Hydrocarbon | | |
| | 14 | Benzene |
| | 15 | Ethylbenzene |
| | 16 | m-xylene |
| | 17 | p-xylene |
| | 18 | o-xylene |
| | 19 | 1,2,3-trimethylbenzene |
| | 20 | 1,2,3,4-tetramethylbenzene |
| | 21 | 1,2,4,5-tetramethylbenzene |
| | 22 | naphthalene |
| Heteroatom Compound | | |
| | 23 | phenol |
| | 24 | 3-(chloromethyl)-heptane |
| | 25 | Dimethyl pentane-dicarboxylate |
| | 26 | 1-isocyanato-4-methylbenzene |
| | 27 | 1,2,5-trithiaheptane |
| | 28 | bis(isocyanatomethyl)benzene |
| | 29 | 1,2,3-isothiourea |
| | 30 | dibutyl phthalate |
| | 31 | 1-methyl-chrysene |
| | 32 | 3,7-dioxabicyclooctane |
| | 33 | chlorobenzene |
| | 34 | triethylamine |
| | 35 | 1,2-dichlorobenzene |
| | 36 | 1,3-dichlorobenzene |
| | 37 | 2,5-dimethylbenzenedithiol |

As can be seen from Table 1, 37 kinds of compounds were detected by GC-MS in the first-stage petroleum ether extract, mostly alkanes and benzene compounds.

(3) Sequential extraction: The second-stage carbon disulfide (CDS) ultrasonic extraction, the third-stage ethanol ultrasonic extraction, the fourth-stage acetone-CDS (V:V=2:1) ultrasonic extraction and the fifth stage tetrahydrofuran ultrasonic extraction, were conducted according to the operations in step (2), to obtain the second-stage CDS extract, the third-stage ethanol extract, the fourth-stage acetone-CDS extract and the fifth-stage tetrahydrofuran extract respectively.

In the present disclosure, the second-stage CDS extract was analyzed by GC-MS, and the results were shown in Table 2. Table 2 shows the results of GC-MS analysis of the second-stage CDS extract.

TABLE 2

Results of GC-MS analysis of the second-stage CDS extract.

| Group Composition | Compound |
|---|---|
| alkane | |
| 1 | heptane |
| 2 | methylcyclohexane |
| 3 | Trans-1,4-dimethylcyclohexane |
| 4 | octane |
| 5 | decane |
| single-ring arene | |
| 6 | Methylbenzene |
| 7 | p-xylene |
| 8 | ethylbenzene |
| 9 | Benzene |
| Tricyclic arene | |
| 10 | Phenanthrene |
| 11 | 1-methylphenanthrene |
| Four-ring arene | |
| 12 | pyrene |
| 13 | 1-benzofluorene |
| 14 | naphthacene |
| 15 | triphenylene |
| 16 | 7-methyl-benzanthracene |
| 17 | 2-methylchrysene |
| 18 | 6,12-dimethyl-benzanthracene |
| 19 | 8,12-dimethyl-benzanthracene |
| 20 | 2-methyl-pyrene |
| 21 | 1-methyl-chrysene |
| 22 | 4,12-dimethyl-benzanthracene |
| 23 | 7,12-dimethyl-benzanthracene |
| 24 | 6,7-dimethyl-benzanthracene |
| 25 | dibenzanthracene |
| 26 | 5-methyl-chrysene |
| heteroatom compound | |
| 27 | 2-methylpyridine |
| 28 | ethanesulfonylethane |
| 29 | 2-ethyl-5-methlypyridine |
| 30 | 5-ethyl-2-methlypyridine |
| 31 | 3-ethyl-4-methlypyridine |
| 32 | (4-iodo-2-methylbutane-2-yl)benzene |
| 33 | N-benzylformamide |
| 34 | benzonaphthothiophene |
| 35 | 1-aminopyrene |
| 36 | benzene-acephenanthrylene |
| 37 | 1-phenyl-benzo-dithiophene |
| 38 | 6,7-dimethoxyquinolin |

As can be seen from Table 2, 38 kinds of compounds were detected by GC-MS in the second-stage CDS extract, mostly polycyclic aromatic hydrocarbons such as three-membered rings and four-membered rings.

In the present disclosure, the third-stage ethanol extract was analyzed by GC-MS, and the results were shown in Table 3. Table 3 shows the results of GC-MS analysis of the third-stage ethanol extract.

TABLE 3

Results of GC-MS analysis of the third-stage ethanol extract

| Group Composition | compound |
|---|---|
| Alkane | |
| 1 | 1,4-dimethylcyclohexane |
| 2 | 1-methylene-2-vinylcyclopentane |
| 3 | 1-methylene-2-vinylcyclohexane |
| 4 | 4,4,6-trimethylcyclohexane |

TABLE 3-continued

Results of GC-MS analysis of the third-stage ethanol extract

| Group Composition | compound |
|---|---|
| Alcohol | |
| 5 | 2-ethylbutane-1-ol |
| 6 | 4-methylpentane-1-ol |
| 7 | E-hexa-3-ene-1-ol |
| 8 | hexane-1-ol |
| 9 | (2-methylcyclohexyl)methanol |
| 10 | hexestrol |
| Aldehyde | |
| 11 | heptadecanal |
| 12 | E-14-hexadecenal |
| 13 | (Z)-2-ethylbut-2-enal |
| 14 | 4-methylcyclohex-3-enecarbaldehyde |
| 15 | 1-methoxypropan-2-aldehyde |
| 16 | 3-methoxy-4-(naphthalen-1-ylmethoxy)benzaldehyde |
| 17 | 2,2-dimethyloctan-3-aldehyde |
| 18 | heptan-4-aldehyde |
| 19 | 1,2,3,4-tetramethlybenzen-2-enal |
| 20 | 2,3,4-trimethylcyclopent-2-enal |
| Arene | |
| 21 | 1-methyl-4-propylbenzene |
| 22 | m-methylisopropyl benzene |
| 23 | o-methylisopropylbenzene |
| 24 | 2-methyl-2,3-dihydro-1H-indene |
| 25 | 2-ethyl-1,4-dimethylbenzene |
| 26 | 1,3-dimethyl-2,3-dihydro-1H-indene |
| Heteroatom compound | |
| 27 | 5-ethyl-2-methylpyridine |
| 28 | 3-ethyl-4-methylpyridine |

As can be seen from Table 3, 28 kinds of compounds were detected by GC-MS in the third-stage CDS extract, mostly alcohols and aldehydes.

In the present disclosure, the fourth-stage acetone-CDS extract was analyzed by GC-MS, and the results were shown in Table 4. Table 4 shows the results of GC-MS analysis of the fourth-stage acetone-CDS extract.

TABLE 4

Results of GC-MS analysis of the fourth-stage acetone-CDS extract

| Group Composition | compound |
|---|---|
| Alkane | |
| 1 | henicosane |
| 2 | docosane |
| 3 | tricosane |
| 4 | tetracosane |
| 5 | pentacosane |
| 6 | heptacosane |
| single-ring Arenes | |
| 7 | trimethylbenzene |
| 8 | 3-methyl-1-ethylbenzene |
| bicyclic arene | |
| 9 | trimethylnaphthalene |
| 10 | tetramethylnaphthalene |
| Tricyclic arene | |
| 11 | 2-methyl-9H-fluorene |
| 12 | 1-methyl-9H-fluorene |
| 13 | 1-methyl-7-isopropylphenanthrene |
| 14 | anthracene |
| 15 | 1-methylanthracene |
| 16 | 1-ethylanthracene |

TABLE 4-continued

Results of GC-MS analysis of the fourth-stage acetone-CDS extract

| Group Composition | compound |
|---|---|
| Four-ring Arene | |
| 17 | methylbenz[a]anthrancene |
| 18 | methylbenzophenanthrene |
| 19 | pyrene |
| 20 | 8,12-dimethyl-benzanthrancene |
| Four-ring arene | |
| 21 | 5-methylchrysene |
| 22 | 2-methyl-pyrene |
| 23 | 1-ethylchrysene |
| 24 | 4,12-dimethyl-benzanthracene |
| 25 | 712-dimethyl-benzanthracene |
| 26 | 6,7-dimethyl-benzanthracene |
| 27 | dibenzanthracene |
| Five-ring Arenes | |
| 28 | 9,10,11,12-tetrahydrobenzopyrene |
| 29 | benzofluoranthene |
| 30 | benzo[e]pyrene |
| 31 | benzo[a]pyrene |
| 32 | indenofluoranthene |
| Heteroatom compound | |
| 33 | 1-methylpyridin-2-one |
| 34 | 2-thiophenecarboxamide |
| 35 | 2,5-diphenylthiophene |
| 36 | naphthobenzothiole |
| 37 | 1-phenyl-benzo-dithiophene |
| 38 | 1,1-dioxytetrahydrothiophene |
| 39 | 3,4-ethylenedioxythiophene |
| 40 | 5-methylbenzothiophene |
| 41 | 2,5-diphenylthiophene |

As can be seen from Table 4, 41 kinds of compounds were detected by GC-MS in the fourth-stage acetone-CDS extract, mostly aromatic hydrocarbons and thiophenes.

In the present disclosure, the fifth-stage tetrahydrofuran extract was analyzed by GC-MS, and the results were shown in Table 5. Table 5 shows the results of GC-MS analysis of the fifth-stage tetrahydrofuran extract.

TABLE 5

Results of GC-MS analysis of the fifth-stage tetrahydrofuran extract

| Group Composition | compound |
|---|---|
| Ketone | |
| 1 | 4-methylpent-3-en-one |
| 2 | cyclohexanone |
| 3 | 4-methoxy-4-methyl-2-pentanone |
| 4 | hexyl-2,5-dione |
| 5 | 3-methylenedihydrofuran-2,5-dione |
| 6 | 3H-benzofuran-2-one |
| 7 | isobenzofuran-1,3-dione |
| Acid | |
| 8 | 4-propylbenzoic acid |
| 9 | 4-isopropylbenzoic acid |
| 10 | 2-methylhexanoic acid |
| Ester | |
| 11 | diisopropyl malonate |
| 12 | 5-oxohexanoate |
| 13 | methyloctynoate |
| 14 | 2-ethylacetic acid |
| 15 | methylnonanoate |
| 16 | methyldecanoate |
| 17 | methylundecanoate |
| 18 | methyllaurate |

TABLE 5-continued

Results of GC-MS analysis of the fifth-stage tetrahydrofuran extract

| Group Composition | compound |
|---|---|
| 19 | methylhexadecanoate |
| 20 | methylstearate |
| 21 | methylarachidate |
| 22 | methylbehenate |
| Furan compound | |
| 23 | 4-methyldibenzofuran |
| 24 | naphtho[2,3-b][1]benzofuran |
| 25 | naphtho[2,3-a][1]benzofuran |
| 26 | Dinaphthofuran |

As can be seen from Table 5, 26 kinds of compounds were detected by GC-MS in the fifth-stage tetrahydrofuran extract, mostly heteroatom compounds such as esters.

The present disclosure provides a method to for separating soluble organic matters in petroleum coke, comprising: drying the petroleum coke to obtain pretreated petroleum coke; extracting the pretreated petroleum coke sequentially with petroleum ether, carbon disulfide, ethanol, acetone-carbon disulfide mixture and tetrahydrofuran to obtain an extract and the treated petroleum coke, wherein the extract comprises soluble organic matter. The method provided by the present disclosure employs extractants with different polarities, i.e., petroleum ether, carbon disulfide, ethanol, acetone-carbon disulfide mixture and tetrahydrofuran, to extract petroleum coke sequentially, so as to detect the composition of the soluble organic matter in petroleum coke at the molecular level, realizing the separation of soluble organic matter in petroleum coke at the macro molecular level, as well as the determination of molecular structure of soluble organic matter in petroleum coke by modern detection means.

The above are merely the preferred examples of the present disclosure, and it should be noted that those skilled in the art can make some improvements and modifications without departing from the principle of the present disclosure, and these improvements and modifications should be regarded within the protection scope of the present invention.

The invention claimed is:

1. A method for separating and detecting soluble organic matter in petroleum coke, comprising:
    drying the petroleum coke to obtain pretreated petroleum coke;
    extracting the pretreated petroleum coke sequentially with petroleum ether, carbon disulfide, ethanol, acetone-carbon disulfide mixture and tetrahydrofuran to obtain an extract and treated petroleum coke, wherein the extract comprises soluble organic matter;
    wherein the sequential extraction of the pretreated petroleum coke with petroleum ether, carbon disulfide, ethanol, acetone-carbon disulfide mixture and tetrahydrofuran specifically comprises:
    mixing the pretreated petroleum coke and petroleum ether, carrying out a first-stage ultrasonic extraction for multiple times, and obtaining a first-stage extract and a first-stage residue; concentrating the first-stage extract to give a first-stage extract, and analyzing the first-stage extract;
    mixing the first-stage residue and carbon disulfide, carrying out a second-stage ultrasonic extraction for multiple times, and obtaining a second-stage extract and a second-stage residue; concentrating the second-stage extract to give a second-stage extract, and analyzing the second-stage extract;

mixing the second-stage residue and ethanol, carrying out a third-stage ultrasonic extraction for multiple times, and obtaining a third-stage extract and a third-stage residue; concentrating the third-stage extract to give a third-stage extract, and analyzing the third-stage extract;

mixing the third-stage residue and acetone-carbon disulfide mixture, carrying out a fourth-stage ultrasonic extraction for multiple times, and obtaining a fourth-stage extract and a fourth-stage residue; concentrating the fourth-stage extract to give a fourth-stage extract, and analyzing the fourth-stage extract;

mixing the fourth stage residue and tetrahydrofuran, carrying out a fifth stage ultrasonic extraction for multiple times, and obtaining a fifth-stage extract and a fifth-stage residue; concentrating the fifth-stage extract to give a fifth-stage extract, and analyzing the fifth-stage extract;

wherein the temperature for each ultrasonic extraction is 30° C. to 40° C., and duration for each ultrasonic extraction is 1.5 h to 3 h.

2. The method according to claim 1, wherein volume ratio of acetone to carbon disulfide in the acetone-carbon disulfide mixture is 2:1.

3. The method according to claim 1, wherein particle size of the petroleum coke is less than 200 mesh.

4. The method according to claim 1, wherein volume ratio of the pretreated petroleum coke to petroleum ether is 1:5 to 10;
the volume ratio of the first-stage residue to carbon disulfide is 1:5 to 10;
the volume ratio of the second-stage residue to ethanol is 1:5 to 10;
the volume ratio of the third-stage residue to acetone-carbon disulfide mixture is 1:5 to 10;
the volume ratio of the fourth-stage residue to tetrahydrofuran is 1:5 to 10.

5. The method according to claim 1, wherein temperature for drying is 98° C. to 105° C.; the duration for drying is 40 to 60 h.

6. The method according to claim 1, wherein the multiple ultrasonic extraction is conducted for more than 30 times.

7. The method according to claim 1, wherein the temperature for each ultrasonic extraction is 35° C., and the duration for each ultrasonic extraction is 2 h.

8. The method according to claim 1, wherein
the method for analyzing the first-stage concentrate is gas chromatography-mass spectrometry.

* * * * *